United States Patent [19]

Bowden

[11] 4,098,110

[45] Jul. 4, 1978

[54] DEPTH GAUGE

[75] Inventor: William A. Bowden, Glenview, Ill.

[73] Assignee: Dacor Corporation, Northfield, Ill.

[21] Appl. No.: 793,633

[22] Filed: May 4, 1977

[51] Int. Cl.² .............................................. G01F 23/16
[52] U.S. Cl. .................................................... 73/300
[58] Field of Search .......................... 73/300, 299, 401;
58/126

[56] References Cited

U.S. PATENT DOCUMENTS

| 3,188,864 | 6/1965 | Dean | 73/300 |
| 3,528,290 | 9/1970 | Lecocq | 73/300 |
| 3,717,032 | 2/1973 | Alinari | 73/300 |

Primary Examiner—Donald O. Woodiel
Attorney, Agent, or Firm—Edmond T. Patnaude

[57] ABSTRACT

A capillary depth gauge employs a transparent cover member having an annular magnifying lens portion overlying the capillary passageway to facilitate reading of the gauge.

9 Claims, 4 Drawing Figures

DEPTH GAUGE

The present invention relates in general to portable depth gauges of the type carried by SCUBA divers, and it relates in particular to a new and improved capillary type gauge in which water enters a closed end tube to an extent proportional to the depth of the gauge in the water.

BACKGROUND OF THE INVENTION

Manometer type depth gauges employing a transparent capillary tube closed at one end are well known. While such gauges are simple in construction, having no moving parts, there are, nevertheless, several disadvantages associated with them. For example, because of the small size of the capillary tubes they have been difficult to read. Also, since the ambient water flows into the tubes, they must be cleaned on a regular basis to remove dirt and the like and to prevent the growth of algae within the capillary passageway.

SUMMARY OF THE INVENTION

Briefly, there is provided in accordance with the present invention a capillary tube type depth gauge which is light in weight, small in size, easy to clean and inexpensive to manufacture. The gauge employs a transparent lens member having an annular magnifying lens portion located above an arcuate capillary groove in a surface which is held under compression against an opaque gasket. A face plate carrying peripheral graduations is mounted to the lens member interiorly of the annular lens portion in concentric relationship with said groove.

GENERAL DESCRIPTION OF THE DRAWING

A better understanding of the present invention may be had from a reading of the following detailed description taken in connection with the drawing wherein.

DETAILED DESCRIPTION OF THE INVENTION

Figure 1:
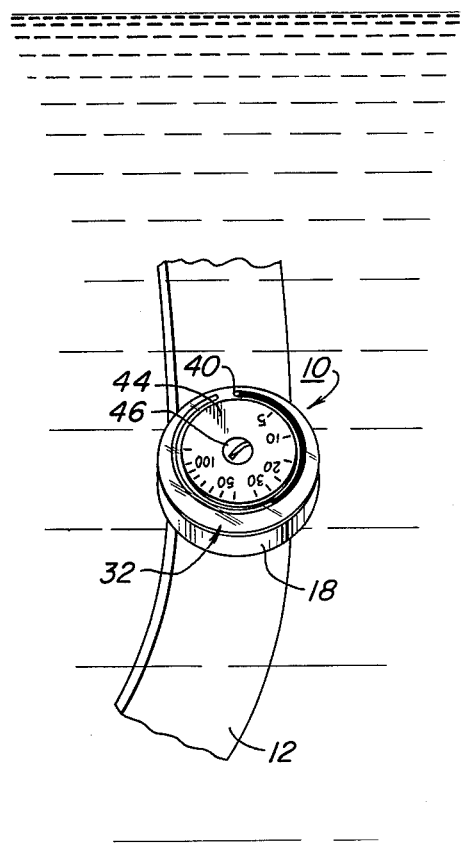
FIG. 1 is a perspective view illustrating a depth gauge embodying the present invention immersed in water.

A depth gauge embodying certain features of the present invention is generally identified by the reference character 10 and, as shown in FIG. 1, may be mounted on a strap or band 12. The band 12 is shown only partially in FIG. 1 but may be a conventional band as commonly used for attaching watches to the wearer's wrist.

The gauge 10 includes a relatively flat cylindrical base member 14, which may be molded of a suitable rigid plastic, fitted in a metallic case member 16 having an upstanding cylindrical wall 18 whose upper end 20 is spun over the upper edge of the base member 14 to permanently lock the two parts together. The base member 14 has a central hole 22 and a hexagonally shaped central recess 24 at the bottom for receiving a complimentary shaped nut 26 to prevent rotation thereof.

Figure 4:
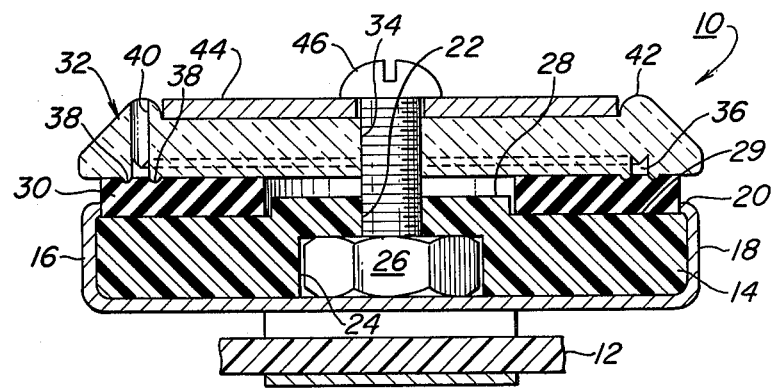
FIG. 4 is a sectional view taken along the line 4—4 of FIG. 2.

A centrally disposed circular boss 28 is provided on the upper surface of the base member 14 and together with the upper edge portion 20 of the casing wall defines an annular groove 29 receiving a resilient annular member 30 formed of an opaque material such, for example, as rubber or neoprene. The upper and lower surfaces of the member 30 are flat and mutually parallel whereby the member 30 may be assembled with either surface at the top or bottom. As shown in FIG. 4 the gasket 30 extends a substantial distance above the casing wall.

Figure 2:
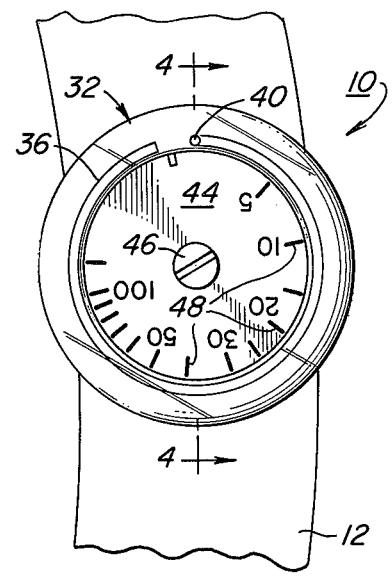
FIG. 2 is a top view showing the front face of the gauge of FIG. 1.
Figure 3:
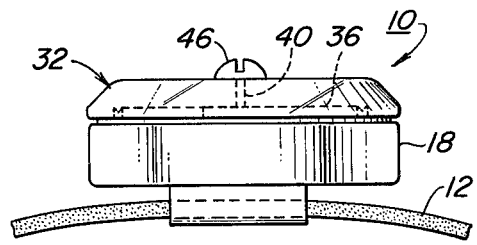
FIG. 3 is an elevational view of the gauge of FIG. 2.

A disc-like lens member 32 having a central hole 34 therethrough is positioned on top of the resilient member 30. The member 32 is molded of a transparent rigid plastic, such as styrene, and has a semicircular groove 36 in the bottom surface thereof. The groove 36 is necessarily less than 360° in angular length and is preferably about 342°, as shown in FIG. 2. The bottom surface of the groove 36, upper as shown in FIG. 4, is V-shaped in cross-section, and a continuous lip or bead 38 depends from the bottom surface of the member 32 adjacent the edges of the groove so as to completely surround the groove. A hole 40 extends from the front face of the member 32 and, as best shown in FIG. 2, opens onto the groove 36 near one end thereof.

The member 32 is provided with a convex annular lens surface 42 located directly above the groove 36. The lens surface 42 defines a circular, depressed area at the top of the member 32 and a centrally apertured, circular plate 44 is disposed therein. A screw 46 has its shank extending through the openings 34 and 22 into threaded engagement with the nut 26 to maintain the gauge in the assembled condition. As the screw 46 is tightened down the lip 38 is pressed into the member 30 to seal the groove 36 from the ambient except through the hole 40.

The plate 44 is provided with a plurality of radial reference marks 48 graduated in feet or meters or both and located at the periphery of the plate 44 to enable a reading of depth. When the gauge 10 is immersed in water, water enters through the hole 40 into the groove 36, the greater the depth the greater the amount of water which enters the groove 36. When the groove 36 is completely filled with air the groove appears to be silver in color. However, as water enters the groove, the portion of the groove containing water appears as the same color as the gasket material 30. Accordingly, the depth of the gauge is read by observing the particular reference mark 40 which is opposite the end of the dark portion of the groove 36. The appearance of the immersed gauge is shown in FIG. 1.

After use, the gauge may be readily disassembled by first removing the screw 46 and then lifting the member 32 away from the gasket member 30. The groove 36 may then be flushed with water and the hole 40 may be cleaned by pushing a pipe cleaner or the like therethrough. If the gauge is to be used in particularly dirty water, a small wad of cotton fiber may be inserted in the hole 40. The plate 44 is set with the zero reference mark opposite the hole 40 for use at sea level.

In order to prevent bubbles from remaining in the groove 36, a length of natural bristle, such as horse hair, may be placed in the groove 36. The bristle has approximately the same length as that of the groove and functions to break the surface tension of the liquid surrounding any bubbles which may tend to be formed in the groove due to rapid acceleration and deceleration of the gauge.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A depth gauge for use under water, comprising
a generally flat, transparent lens member having a semicircular groove in one facial surface thereof,
a gasket held in sealing contact with said facial surface whereby said groove is closed by said gasket and forms a capillary tube,
one end of said tube being closed and the other end being in communication with the exterior of said gauge,
said lens member having a raised, convex annular surface on the side thereof opposite said facial surface and said convex annular surface directly overlying said groove whereby said groove may be observed through said convex annular surface, and
a circular plate member mounted to said lens member within said raised annular surface and having reference marks graduated in depth provided thereon in proximity to said raised annular surface.

2. A depth gauge according to claim 10, comprising
a continous lip on said lens member lying adjacent the inner and outer arcuate edges of said groove and completely surrounding said groove,
said lip being pressed into said gasket.

3. A depth gauge according to claim 10 wherein said gasket member has a flat surface facing said lens member.

4. A depth gauge according to claim 10 wherein
said hole opens to the ambient in proximity to the periphery of said plate.

5. A depth gauge according to claim 10 wherein said lens member has a circular outer edge.

6. A depth gauge according to claim 10 wherein the bottom of said groove is V-shaped.

7. A depth gauge for use under water comprising
a base member,
an annular resilient gasket member disposed on said base member,
a disc-like lens member positioned over said gasket,
said lens member having a semi-circular groove in the surface thereof facing said gasket,
a continuous lip on said lens member lying adjacent the inner and outer arcuate edges of said groove and completely surrounding said groove,
a hole extending through said lens member from the external surface thereof to a location opening onto one end of said groove thereby to connect said one end to the ambient,
a circular plate member mounted on said lens member in concentric relationship with said groove and having reference marks graduated in depth provided thereon in proximity to the periphery thereof,
said plate having an external radius less than the radius of said groove, and
means for securing all of said members together with said gasket compressed between said base member and said lens member pressing said lips into said gasket to seal all but said one end of said groove from the ambient.

8. A depth gauge for use under water, comprising
a base member,
an annular resilient gasket member disposed on said base member,
a disc-like lens member positioned over said gasket,
said lens member having a semi-circular groove in the surface thereof facing said gasket,
a hole extending through said lens member from the external surface thereof to a location opening onto one end of said groove thereby to connect said one end to the ambient,
a circular plate member mounted on said lens member in concentric relationship with said groove and having reference marks graduated in depth provided thereon in proximity to the periphery thereof,
said plate having an external radius less than the radius of said groove,
means for securing all of said members together with said gasket compressed between said base member and said lens member to seal all but said one end of said groove from the ambient,
said lens member having a convex annular surface disposed opposite said groove and concentric therewith for magnifying the image of said groove,
said lens member having a flat circular recess on the external side thereof defined by said convex annular surface, and
said plate being fitted in said recess.

9. A depth gauge for use underwater, comprising
a transparent lens member having a semicircular groove in one facial surface thereof,
a base member,
an annular gasket disposed between said lens and base members and overlying said groove,
a nut captured in said base member,
a screw extending through central openings in said lens member and said gasket into mating relationship with said nut,
said screw and nut securing said lens and base members together and compressing said gasket against said one facial surface of said lens member to seal said groove from the ambient, and
a passageway extending through said lens member from one end of said groove to the exterior of said gauge for communication with the water in which said gauge is immersed.

* * * * *

UNITED STATES PATENT AND TRADEMARK OFFICE
CERTIFICATE OF CORRECTION

PATENT NO. : 4,098,110
DATED : July 4, 1978
INVENTOR(S) : William A. Bowden

It is certified that error appears in the above–identified patent and that said Letters Patent are hereby corrected as shown below:

Claims 2, 3, 4, 5 and 6 line 1 "10" should be -1-.

Signed and Sealed this

Fifth Day of December 1978

[SEAL]

Attest:

RUTH C. MASON
Attesting Officer

DONALD W. BANNER
Commissioner of Patents and Trademarks